(12) United States Patent
Owens

(10) Patent No.: US 8,004,463 B2
(45) Date of Patent: Aug. 23, 2011

(54) SYSTEMS AND METHODS FOR DETERMINING DIRECTION-OF-ARRIVAL

(75) Inventor: Mark A. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 331 days.

(21) Appl. No.: 11/942,077

(22) Filed: Nov. 19, 2007

(65) Prior Publication Data

US 2009/0128397 A1    May 21, 2009

(51) Int. Cl.
*G01S 5/02* (2010.01)
(52) U.S. Cl. ........................................................ 342/417
(58) Field of Classification Search .................. 342/147, 342/417
See application file for complete search history.

(56) References Cited

U.S. PATENT DOCUMENTS

| | | | | |
|---|---|---|---|---|
| 5,315,308 | A * | 5/1994 | Nehorai et al. | 342/448 |
| 6,407,702 | B1 * | 6/2002 | Bergman et al. | 342/364 |
| 6,990,334 | B1 * | 1/2006 | Ito | 455/414.3 |
| 7,551,144 | B2 * | 6/2009 | Manholm et al. | 343/726 |
| 7,619,579 | B2 * | 11/2009 | Rahamim et al. | 343/793 |
| 2009/0009394 | A1 * | 1/2009 | Mestre Pons | 342/417 |

* cited by examiner

*Primary Examiner* — Thomas H Tarcza
*Assistant Examiner* — Nga X Nguyen
(74) *Attorney, Agent, or Firm* — SoCal IP Law Group LLP; John E. Gunther; Steven C. Sereboff

(57) ABSTRACT

The disclosed system and method for determining direction-of-arrival generally includes an antenna element and a processor. The antenna element may configured to generate a signal in response to an electromagnetic wave. The processor may be process the signal to determine the direction-of-arrival of the electromagnetic wave. Further, the direction-of-arrival may be determined based on an estimate of the direction-of-arrival of at least one of the electric field and the magnetic field of the electromagnetic wave.

20 Claims, 3 Drawing Sheets

SYSTEMS AND METHODS FOR DETERMINING DIRECTION-OF-ARRIVAL

FIELD OF INVENTION

The present invention generally concerns electromagnetic phenomena; and more particularly, representative and exemplary embodiments of the present invention generally relate to systems, devices and methods for determining the source direction of incident electromagnetic energy.

BACKGROUND OF INVENTION

Systems for determining the properties of an incident electromagnetic signal have a wide variety of applications. For example, mariners and aviators often make use of such systems for purposes of navigation. In addition, these systems may be applied in the military context to surveil troop movements and evaluate enemy communications systems.

Incident signals may be processed to generate a wide variety of information related to the signal. For instance, a signal may be processed to determine the direction of arrival of the signal. The most common direction finding systems include monopulse architectures and phase interferometer systems. These designs make use of a measurement of the time-of-arrival of the source signal upon the antenna array elements. This measurement is generally manifested as a phase measurement due to the accuracy with which time may be inferred when the baseline is a significant fraction of the wavelength. In conventional systems, the antenna elements are configured such that (a) they are of the same design, (b) they have the same orientation, and they (c) have spatial separation (i.e. baseline separation) that is a significant fraction of a wavelength if not multiple wavelengths of the wavelength of interest. As a consequence of these design considerations, signals of interest that have a substantial wavelength call for large spatial separations, increasing the bulk and decreasing transportability of conventional systems.

In addition to issues of size, operation of conventional antenna arrays may be complicated by the tendency of elements to radiate in response to an incident beam. Specifically, incidence of an electromagnetic wave within one element within an antenna array may cause that element to generate an induced electromagnetic wave. This induced electromagnetic wave may impair detection of the electromagnetic wave of interest within other elements and reduce the utility of the system as a whole.

SUMMARY OF THE INVENTION

In various representative aspects, the present invention provides systems and methods for determining the direction-of-arrival of an electromagnetic wave. Advantages of the present invention will be set forth in the Detailed Description which follows and may be apparent from the Detailed Description or may be learned by practice of exemplary embodiments of the invention. Still other advantages of the invention may be realized by application of any of the instrumentalities, methods or combinations particularly pointed out in the Claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for radio communication, detection of electromagnetic waves, transmission of electromagnetic beams, etc. Certain representative implementations may include, for example: a marine communications system, an airborne direction finding system, a handheld radar detector, and so forth. Such representative implementations are provided as a specific enabling disclosure that may be generalized to any application of the disclosed system, device and method for molecular-scale electronic switching in accordance with various embodiments of the present invention.

In various embodiments in accordance with the present invention, a system for determining direction-of-arrival may include antenna elements, processors, display screens, input ports, output ports, power sources, combinations thereof, and/or the like. For example, the present invention may be configured for operation with external electronic equipment such as portable computer systems. In addition, the present invention may be configured in a stand-alone configuration, for instance, as a handheld direction finder suited to a particular frequency.

Figure 1:
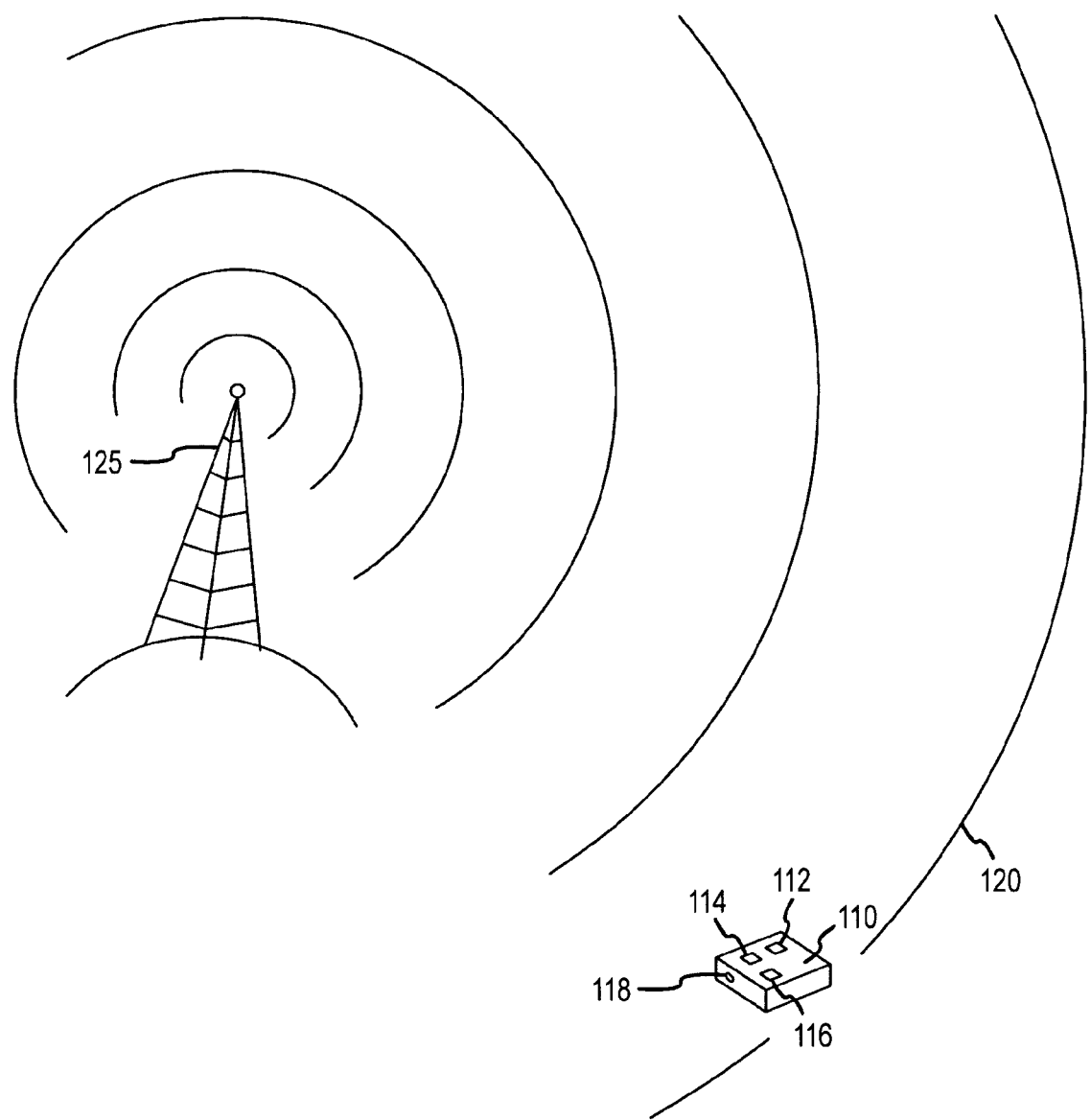
FIG. 1 representatively illustrates an antenna system 100 disposed in the path of a propagating electromagnetic wave 120 in accordance with an exemplary embodiment of the present invention.

As generally depicted in FIG. 1, a representative embodiment of the present invention provides an antenna system 110 disposed within the effective range of a propagating electromagnetic wave 120. In one representative embodiment, a transmitter 125 generates wave 120 having a frequency of between about 50 MHz and about 500 MHz. Antenna system 110 may be suitably configured to receive and process wave 120, for example, to determine the direction and/or location of transmitter 125 with respect to the position of antenna system 110.

Transmitter 125 may be suitably configured to produce electromagnetic radiation having any specified characteristic such as a predetermined frequency, wavelength, etc. Transmitter 125 may comprise any system for generating an electromagnetic signal such as a mobile search/track radar, a maritime radar, an FM radio transmitter, a television transmitter, a communications relay, combinations thereof, and/or the like. The parameters of transmitter 125 may be influenced by considerations such as the parameters of transmitted waves 120, the parameters of systems configured to receive transmitted waves 120, the parameters of the power source, and so forth. In one representative embodiment, transmitter 125 is a military communications system subject to surveillance.

Electromagnetic wave 120 may be suitably configured to propagate in any suitable manner, such as according to a specified polarization, in a specified direction, etc. For example, electromagnetic wave 120 may comprise a focused beam, a concentrically propagating wave, or any appropriately formed wave or their combinations. Electromagnetic wave 120 may be configured to transmit information, such as in embodiments wherein electromagnetic wave 120 is generated in conjunction with a communication system. Alternatively, electromagnetic wave 120 may arise via operation of machinery, for instance, in response to the generation of heat, in response to magnetic oscillation, and so forth.

Antenna system 110 may be suitably configured to respond to an incident electromagnetic signal. Antenna system 110 may comprise any system for detecting incident electromagnetic radiation including an antenna element 112, pluralities of such elements 112, etc. Antenna system 110 may also include, a power source 114, a display screen 116, a port 118, multiples and/or combinations thereof, etc. Further, antenna system 110 may be configured for stand-alone operation or for operation with other systems, as with other electronic devices and power systems. In addition, antenna system 110 may be suitably adapted to detect a specified incident electromagnetic signal, like electromagnetic wave 120 having a specified wavelength.

Port 118 may be suitably configured to receive and/or transmit signals, such as into and/or out of antenna system 110. Port 118 may comprise any system for the transfer of information and/or power between one or more systems. For example, port 118 may comprise a headphone jack suited to receive a headphone plug with which a user may receive an audio alert in response to incidence of electromagnetic wave 120 within antenna system 110. As another example, port 118 may be configured to transfer information and/or power between antenna system 110 and peripheral devices including a keyboard, a mouse, a printer, a monitor, a power cable, combinations thereof, etc. As yet another example, port 118 may be adapted to couple antenna system 110 to a computer such that signals generated within antenna system 110 in response to incidence of antenna system 110 with electromagnetic wave 120 may be transmitted to the computer, for instance, for processing via the computer. Various representative technologies such as Universal Serial Bus (USB), Small Computer System Interface (SCSI), and so forth may be implemented as one or more port 118 in accordance with one exemplary embodiment of the present invention. Port 118 connectivity may be achieved with various devices including a computer memory, a processor, software, etc.

Display screen 116 may be suitably adapted to represent information relating to system operations, such as detection of a signal, a signal as processed, system connectivity, and the like. Display screen 116 may comprise any system for conveying information such as a liquid crystal display, a light emitting diode, a printer, an electromechanical sound system, etc. In one representative embodiment, display screen 116 is responsive to user inputs via a touchscreen. In another representative embodiment, display screen 116 provides a visual representation of incidence with electromagnetic wave 120 via a graphic of the sinusoidal response, if any, occurring within antenna element 112.

Power source 114 may be suitably adapted to supply energy. Power source 114 may comprise any system configured to activate and/or sustain operation of electrical systems, mechanical equipment, combinations thereof, and the like. In one representative embodiment, power source 114 comprises a chemical battery sufficient to power antenna element 112, display screen 116, and any other electrical equipment within antenna system 110 for a specified duration. Power source 114 may, however, comprise any suitable mechanism including a mechanical energy storage device, a capacitor, a photovoltaic device, an inductor, combinations of such devices, etc.

Antenna element 112 may be suitably adapted to generate a signal in response to incidence with electromagnetic radiation. In one representative embodiment, antenna element 112 comprises a plurality of dipole antennae configured to generate a specified resonant voltage in response to incidence with a wavelength of interest. For example, in a military application, the operating frequency of an enemy weapons system may be known and antenna element 112 may be adapted to resonate in response to incidence with this known operating frequency.

Figure 2:
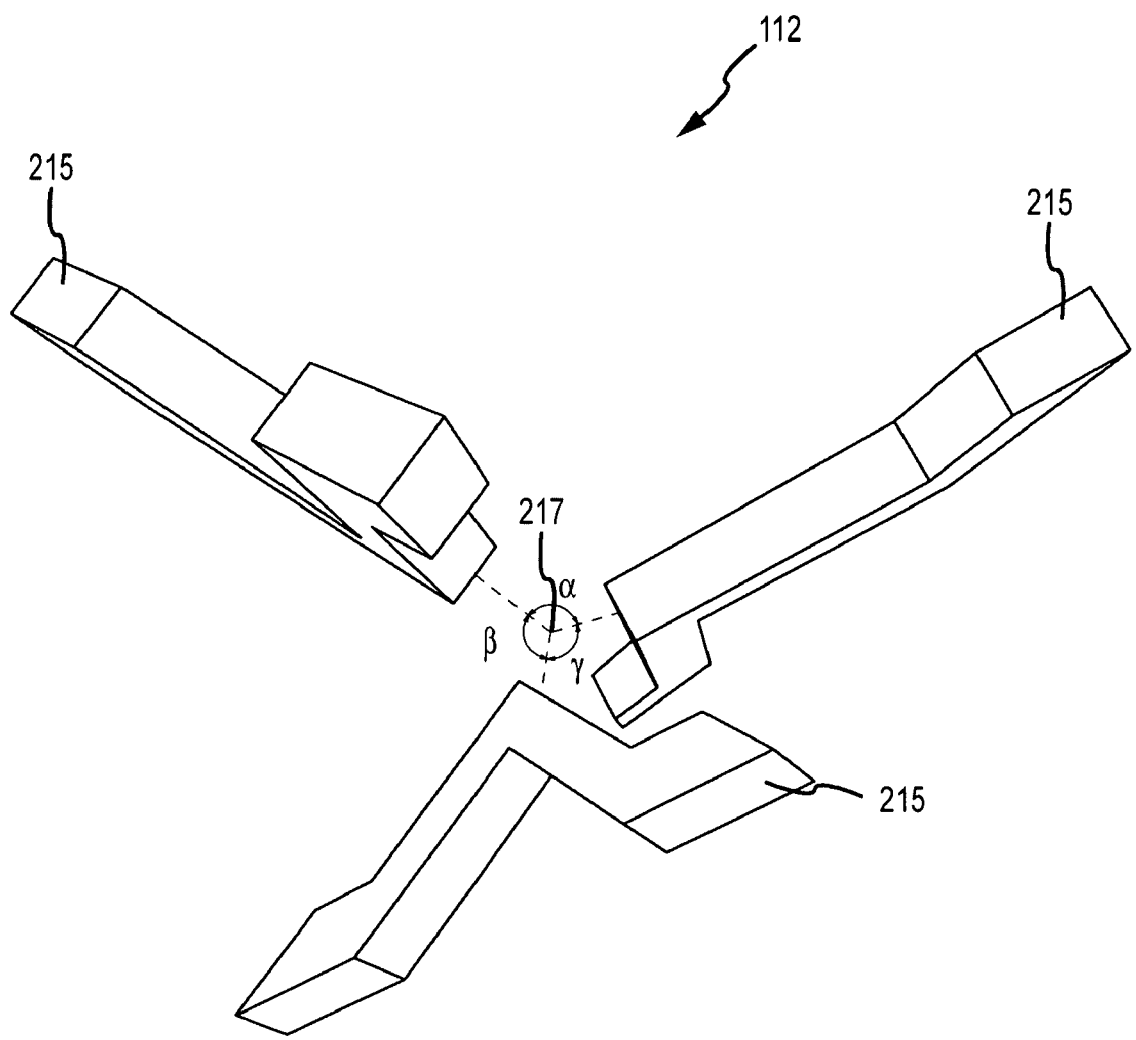
FIG. 2 representatively illustrates an antenna system 100 comprising three spatially diverse dipole elements 215 in accordance with an exemplary embodiment of the present invention.

As generally depicted in FIG. 2, one representative embodiment of the present invention provides antenna element 112 comprising three dipole antennae 215 suitably arranged in diverse orientations. Each dipole antenna 215 is fixed in a substantially unique plane, $\alpha$, $\beta$, and $\gamma$, and further fixed with respect to a substantially central point 217, i.e., the phase centers of the dipole antennae 215 may be substantially colocated.

Antenna system 110 may be considered in a space-fixed coordinate system featuring an x, y, z reference frame having spherical coordinates $\theta$ and $\phi$. The unit vector in the direction of arrival of incident wave 120 may be defined as $u_r$ and the local orthogonal axes may be defined as $u_\theta$ and $u_\phi$. Incident electromagnetic wave 120 includes an incident electrical field, t, which may be expressed as a three dimensional vector according to the equation:

$$t = \begin{bmatrix} t_x \\ t_y \\ t_z \end{bmatrix} = e_\theta \cdot u_\theta + e_\phi \cdot u_\phi + e_r \cdot u_r,$$

where $t_x$, $t_y$, and $t_z$, are the directional components of the incident electric field, and $e_\theta$, $e_\phi$, and $e_r$ represent the magnitudes of the electric field t in the $\theta$, $\phi$, and r directions, respectfully. The magnitude of t in any direction may be represented by a complex scalar value in which the real and imaginary components define the value of t at two different points in time at a given location. Nevertheless, even if the real and imaginary components of t are different, they must both lie in a plane orthogonal to the line-of-sight ($u_r$) from dipole antenna 215 to transmitter 125, in which case $e_r$ would be zero.

In circumstances where t comprises a linear polarization, $e_r$ would be zero and there would be a lack of observability with respect to $u_r$. In some circumstances, t is not linearly polarized and may fluctuate over time, for example, due to changes in the aspect angle and/or orientation of the emission source. In these circumstances, the observed variations in t may be described by the equation:

$$T=(Re(t_n), Im(t_n), Re(t_{n+1}), Im(t_{n+1}), \dots),$$

where T is a strictly real 3 by 2N matrix comprised of N observations of t, $Re(t_n)$ is the real component of t at a specified time n, and $Im(t_n)$ is the imaginary component of t at time n. Given the relationship between the electric field t and the direction of propagation of incident electromagnetic wave 120, determining the normal to T may give a line-of-sight estimate for the direction of propagation. Specifically, the normal to T may be the eigenvector associated with the smallest magnitude eigenvector in the covariance matrix:

$$CT = T \cdot T^T.$$

In some circumstances, the minimum eigenvalue CT may be zero, in which case all estimated values of t would lie exactly in a plane defined by the direction-of-arrival normal vector $u_r$. In such circumstances, only a single estimate would be needed since t would not fluctuate as a function of time. However, for emissions in which t does not necessarily lie in a single plane at all times, multiple estimates may be employed to determine the error of the readings. Specifically, even waves 120 in which t fluctuates will feature two eigenvalues of CT that are zero. Accordingly, the eigenvalues of CT may be determined to evaluate the error in the direction-of-arrival determination. For example, to resolve ambiguity, if any, between the direction of unit vector $u_r$ and the direction of unit vector $-u_r$, other suitable criterion such as information that transmitter 125 is somewhere "ahead of" antenna element 110 may be utilized.

An array of dipole antennae 215 may be configured to generate a voltage in response to incidence with electromagnetic wave 120 according to the equation:

$$v = a \cdot r(\theta,\phi) \cdot t,$$

where v is the voltage generated by dipole antenna 215 in response to incidence with electromagnetic wave 120; a is a complex scalar implemented to account for constraints such as signal strength, system gain, and/or the like; $r(\theta,\phi)$ is the dipole orientation; and t describes the incident electric field. Assuming that a is constant for all elements of a calibrated system, the values of t and $\theta,\phi$ may be determined based on the measured voltage v. The scalar a will vary with, inter alia, the properties of dipole antenna 215. However, given that the quantity of interest is the direction-of-arrival, the magnitude of the voltage at any time as influenced by the scalar a may is not necessarily problematic.

The dipole pattern $r(\theta,\phi)$ may be characterized by a single real-valued vector d in accordance with the equation:

$$r(\theta,\phi) = d - (d \cdot u_r) \cdot u_r,$$

where $u_r$ is always taken to mean $u_r(\theta,\phi)$. Combining this equation with the description of voltage:

$$v = a \cdot r \cdot t = [d - (d \cdot u_r) \cdot u_r] \cdot (e_\theta \cdot u_\theta + e_\phi \cdot u_\phi) = e_\theta \cdot (d \cdot u_\theta) + e_\phi \cdot (d \cdot u_\phi),$$

where the constant scalar a is included in the values of e. Factoring in the dipole vectors of each dipole antenna 215, the voltage produced is governed by the equation:

$$v = e_\theta \cdot (D \cdot u_\theta) + e_\phi \cdot (D \cdot u_\phi) = D \cdot t,$$

where D is the matrix of the dipole vectors of the dipole antennae 215. Specifically, D is may be described as:

$$D = (d_n \, d_{n+1} \dots)^T,$$

where $d_n$ is the dipole vector describing of the nth dipole antenna 215.

Solving for t according to the pseudoinverse operation, $t = (D^T \cdot D)^{-1} \cdot D^T \cdot v$.

According to these relationships, a user may determine the direction-of-arrival of electromagnetic wave 120 via a plurality of dipole antennae 215 based on an estimation of direction-of-arrival of the electric field of the incident electromagnetic wave 120.

In another representative embodiment, antenna element 110 may be configured to determine the direction of arrival of electromagnetic wave 120 based on measurement of the magnetic field, h, of electromagnetic wave 120. Specifically, h may be defined as:

$$h = r \times u_r.$$

where h describes the magnetic field of electromagnetic wave 120, r is the dipole orientation of dipole antenna 215 and $u_r$ is the unit vector describing the direction of arrival of electromagnetic wave 120. The magnetic field h may be described in terms of a single real-valued vector d in accordance with the equation:

$$h = [d - (d \cdot u_r) \cdot u_r] \times u_r.$$

As was done with regard to measuring the electric field, this equation may be manipulated to describe the unit vector, $u_r$, in terms of the real-valued vector, d:

$$h = d \times u_r.$$

Defining the magnetic field of the incident signal as b, the equation becomes:

$$b = t \times u_r = (e_\theta \cdot u_\theta + e_\phi \cdot u_\phi) \times u_r = -e_\theta \cdot u_\phi + e_\phi \cdot u_\theta.$$

In view of this equation, the measured current, i, in the antenna element 110 may be described as:

$$i = h \cdot b = (d \times u_r) \cdot (-e_\theta \cdot u_\phi + e_\phi \cdot u_\theta) = -e(d \cdot u_\phi) + e_\phi \cdot (d \cdot u_\theta).$$

While these embodiments provide representative approaches for evaluating the direction of arrival of an incident wave 120, some theoretical and practical issues may be considered. For example, operation defined by the dipole equations are equally valid if the dipole moment generated by dipole antenna 215 is a complex number. However, when defining a complex dipole moment, there may be an issue as to whether two dipole moments generate the same equivalent result. Specifically, using a dipole moment scaled by an arbitrary scalar value a may result in a similar dipole solution to t but with t scaled by the constant a. Consequently, two dipole moments are equivalent if when 'normalized' they are equal, that is, in a situation wherein the norm of the vector is unity. However, in the case of a complex dipole value, we must add an additional criterion.

The most logical additional criterion is that the real component of the dipole vector be maximized. Once normalized, the most that a dipole can differ from this criterion is that it needs to be multiplied by complex scalar of the form exp (j*α). It can be shown that the criterion of maximizing the real component of the dipole vector may result in the real and imaginary component being orthogonal to each other. Therefore, a complex dipole moment may be considered to represent two real-valued dipoles that are orthogonal to each other and 90 degrees out of phase with each other.

Further, the performance of dipole antenna 215 may be related to the signal-to-noise ratio (SNR) of wave 120, but performance may also be related to the polarization diversity of the wave 120. The ideal polarization is in fact circular, defined by the plane normal to direction-of-arrival with a single measurement. By the same token, a pure linear signal can only be resolved at the plane in which the direction-of-arrival vector lies. Since it is very unlikely that any signal is purely linear, adding additional estimates of the e-field vector to the estimate of the covariance matrix only improves the final result. An additional issue in this approach is the relative robustness in the presence of systemic residual receiver calibration errors. Specifically, in the present system, the gain and phase errors may be compared to the dipole moment in magnitude. Compare this to a phase interferometer, where phase errors should be compared to the baseline separation.

Additionally, the more diverse the orientation of dipole antennae 215, the fewer the ambiguities created when determining the direction-of-arrival of wave 120.

Finally, in the present representative approaches for determining direction-of-arrival, the dipole moments are allowed to be complex-valued vectors. Allowing this allows a larger class of antenna responses to be modeled. However, in the representative embodiments described herein, the size of the dipole antennae 215 may be less than a wavelength of the incident wave 120, and that in turn tends to force the antenna response towards that of a dipole.

Figure 3:
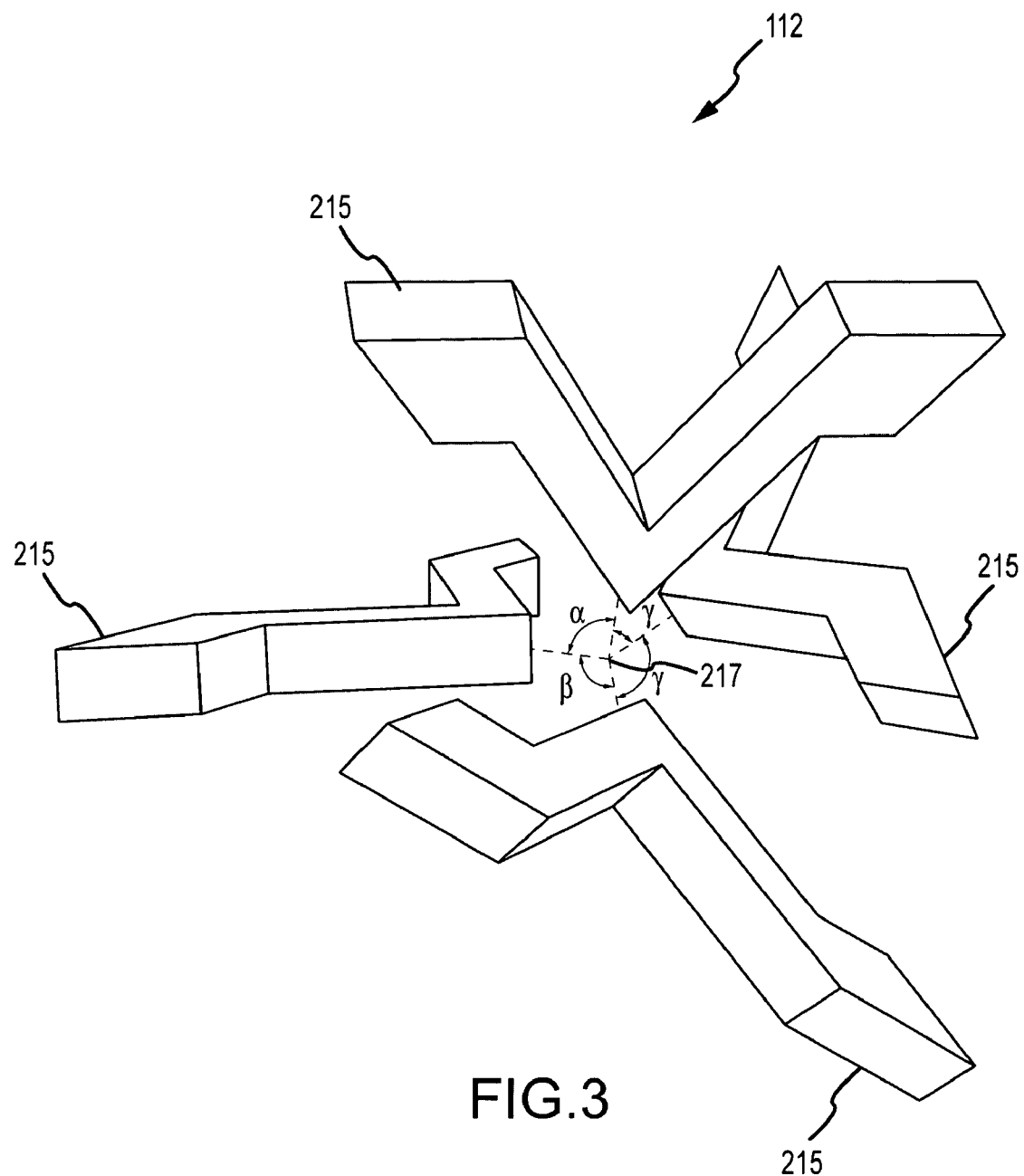
FIG. 3 representatively illustrates an antenna system 100 comprising four spatially diverse dipole elements 215 in accordance with an exemplary embodiment of the present invention.

Referring now to FIG. 3, one representative embodiment of the present invention provides antenna element 110 comprising four dipole antennae 125 featuring diverse orientations with respect to a substantially central point 217. Note that dipole antennae 125 may be variously arranged with respect to central point 217, substantially along the α, β, γ, and δ planes. Such an embodiment may provide the minimum practical number of dipole antennae 125 in that fewer than three dipole antennae 125 may prevent estimation of error and may therefore result in ambiguities in the estimated direction-of-arrival. The above equations relating to determining the direction of arrival based on measurement of electric field, t, and/or the magnetic field, h, of an incident wave 120 may be applied to the antenna element 110 featured in FIG. 3.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A system for determining the direction-of-arrival of an electromagnetic wave, said system comprising:
    an antenna element to generate a signal in response to the electromagnetic wave, the antenna element comprising three or more dipole antennae arranged in diverse orientations, wherein phase centers of all of the dipole antennae are substantially colocated; and
    a processor responsive to the signal, wherein:
        the processor processes the signal to determine a plurality of N observations $t_n$ of the electric field of the electromagnetic wave at a corresponding plurality of time points, where $t_n$ is a three-dimensional vector representing the electric field at a time point n and N is integer greater than one,
        the processor forms a strictly real 3 by 2N matrix T from the plurality of observations, wherein $$T=(Re(t_n)Im(t_n), Re(t_{n+1})Im(t_{n+1}), \ldots),$$

$Re(t_n)$ is the real component of $t_n$, and
        $Im(t_n)$ is the imaginary component of $t_n$; and
        the processor determines a normal to the matrix T to determine the direction-of-arrival.

2. The system of claim 1, wherein the electromagnetic wave has a frequency of between about 50 and about 500 megahertz.

3. The system of claim 1, wherein:
    the antenna element consists of three dipole antennae.

4. The system of claim 1, wherein:
    the antenna element consists of four dipole antennae.

5. The system of claim 1, wherein:
    the processor processes the signal in accordance with the equation:

$$v = e_\Theta(d \cdot u_\Theta) + e_\Phi(d \cdot u_\Phi)$$

wherein:
        v=a voltage produced by each dipole antennae,
        d=a vector characterizing a dipole pattern of each dipole antennae,
        $e_\Theta$=magnitude of the electric field in a $\Theta$ direction,
        $e_\Phi$=magnitude of the electric field in a $\Phi$ direction,
        $u_\Theta$=unit vector in the $\Theta$ direction, and
        $u_\Theta$=unit vector in the $\Phi$ direction.

6. The system of claim 1, wherein:
    the antenna element and processor are embedded within a handheld device, and the processor is configured for communication with a user output device.

7. A method for determining the direction-of-arrival of an electromagnetic wave, said method comprising:
  generating a signal in response to the electromagnetic wave, the signal generated by an antenna element comprising three or more dipole antennae arranged in diverse orientations, wherein phase centers of all of the dipole antennae are substantially colocated;
  processing the signal to determine a plurality of N observations $t_n$ of the electric field of the electromagnetic wave at a corresponding plurality of time points, where $t_n$ is a three-dimensional vector representing the electric field at a time point n and N is integer greater than one;
  forming a strictly real 3 by 2N matrix T from the plurality of observations, wherein $$T=(Re(t_n)Im(t_n),Re(t_{n+1})Im(t_{n+1}),\ldots),$$

$Re(t_n)$ is the real component of $t_n$, and
  $Im(t_n)$ is the imaginary component of $t_n$; and
  determining a normal to the matrix T to determine the direction-of-arrival of the electromagnetic wave.

8. The method of claim 7, wherein the electromagnetic wave has a frequency of between about 50 and about 500 megahertz.

9. The method of claim 7, wherein:
  the antenna element consists of three dipole antennae.

10. The method of claim 7, wherein:
  the antenna element consists of four dipole antennae.

11. The method of claim 7, wherein:
  the signal is processed in accordance with the equation:

$$v=e_\Theta(d\cdot u_\Theta)+e_\Phi(d\cdot u_\Phi)$$

wherein:
  v=a voltage produced by each dipole antennae,
  d=a vector characterizing a dipole pattern of each dipole antennae,
  $e_\Theta$=magnitude of the electric field in a $\Theta$ direction,
  $e_\Phi$=magnitude of the electric field in a $\Phi$ direction,
  $u_\Theta$=unit vector in the $\Theta$ direction, and
  $u_\Phi$=unit vector in the $\Phi$ direction.

12. The method of claim 7, wherein:
  the antenna element and processor are embedded within a handheld device, and
  the processor is in communication with a user output device.

13. A system for determining the direction-of-arrival of an electromagnetic wave, wherein the electromagnetic wave has a frequency of between about 50 and about 500 megahertz, said system comprising:
  an antenna element responsive to the electromagnetic wave, wherein:
    the antenna element generates a signal in response to incidence with the electromagnetic wave, and
    the antenna element comprises a plurality of dipole antennae arranged at diverse orientations, wherein phase centers of all of the plurality of dipole antennae are substantially colocated; and
  a processor responsive to the signal, wherein:
    the processor processes the signal to determine a plurality of N observations $t_n$ of the electric field of the electromagnetic wave at a corresponding plurality of time points, where $t_n$ is a three-dimensional vector representing the electric field at a time point n and N is integer greater than one,
    the processor forms a strictly real 3 by 2N matrix T from the plurality of observations, wherein $$T=(Re(t_n)Im(t_n),Re(t_{n+1})Im(t_{n+1}),\ldots),$$

$Re(t_n)$ is the real component of $t_n$, and
    $Im(t_n)$ is the imaginary component of $t_n$; and
    the processor determines a normal to the matrix T to determine the direction-of-arrival.

14. The system of claim 13, wherein:
  the antenna element consists of three dipole antennae.

15. The system of claim 13, wherein:
  the antenna element consists of four dipole antennae.

16. The system of claim 13, wherein:
  the processor processes the signal accordance with the equation:

$$v=e_\Theta(d\cdot u_\Theta)+e_\Phi(d\cdot u_\Phi)$$

wherein:
  v=a voltage produced by each dipole antennae,
  d=a vector characterizing a dipole pattern of each dipole antennae,
  $e_\Theta$=magnitude of the electric field in a $\Theta$ direction,
  $e_\Phi$=magnitude of the electric field in a $\Phi$ direction,
  $u_\Theta$=unit vector in the $\Theta$ direction, and
  $u_\Phi$=unit vector in the $\Phi$ direction.

17. The system of claim 13, wherein:
  the antenna element and processor are embedded within a handheld device, and
  the processor is in communication with a user output device.

18. The system of claim 1, wherein the normal to the matrix T is determined as the eigenvector associated with the smallest magnitude eigenvalue of the covariance matrix $CT=T\cdot T^T$.

19. The method of claim 7, wherein determining the normal to the matrix T comprises determining the eigenvector associated with the smallest magnitude eigenvalue of the covariance matrix $CT=T\cdot T^T$.

20. The system of claim 13, wherein the normal to the matrix T is determined as the eigenvector associated with the smallest magnitude eigenvalue of the covariance matrix $CT=T\cdot T^T$.

* * * * *